June 11, 1968    D. F. WILCOCK ET AL    3,387,482
BEARING SUSPENSION SYSTEM

Filed Feb. 12, 1965    2 Sheets-Sheet 1

Inventors,
Gerald J. Kushner,
Donald F. Wilcock,
by J.F. McDevitt
Their Attorney.

Inventors,
Gerald J. Kushner,
Donald F. Wilcock,
by
Their Attorney.

United States Patent Office 3,387,482
Patented June 11, 1968

3,387,482
BEARING SUSPENSION SYSTEM
Donald F. Wilcock, Pittsfield, Mass., and Gerald J. Kushner, Huntsville, Ala., assignors to General Electric Company, a corporation of New York
Filed Feb. 12, 1965, Ser. No. 432,097
6 Claims. (Cl. 73—1)

This invention relates generally to a bearing suspension system for supporting an object so that it can move about all three principal axes. More particularly, the invention deals with an externally pressurized spherical bearing suspension having reference means to indicate spatial orientation of the supported object. Specifically, the invention deals with a spherical bearing suspension associated with gimbal means so as to indicate the attitude angle of the supported object.

Externally pressurized spherical bearing supports are used to simulate the dynamic characteristics of various spacecraft and air-borne equipment in flight. Existing simulators lack accurate means for measuring spatial attitude which is especially disturbing in programed flight tests. Measurements are often made with means which introduce random error torques to further add to the inaccuracy. It is desirable for such space motion simulators to provide accurate means for indicating the attitude angle of the object being supported. In some systems, attitude reference is measured by computer calculation of trigonometric spatial relations which is both complex and highly expensive method of measurement.

It is an important object of the invention, therefore, to provide a bearing support system which allows accurate attitude measurement in a simplified manner.

It is another object of the invention to provide a bearing support system having direct precision angle readout about three orthogonal axes.

Still another important object to the invention is to provide a bearing support having gimbal means capable of following the supported object without physical contact with it. These and other important objects of the invention will be apparent from the following detailed description taken in connection with the accompanying drawings in which.

Briefly, the present invention is directed to a bearing support having attitude reference means which comprises platform means fixed to a spherically shaped rotor, a spherically shaped bearing surface supporting said rotor, gimbal means disposed with respect to said rotor so that the intersection of the gimbal axes coincides substantially with the center of rotation for the rotor, said gimbal means having sensing means thereon for indicating relative displacement between said gimbal members and the platform means, and means for supplying a pressurized fluid to the bearing surface. By sensing relative displacement of the gimbals from the platform means, the location of the latter component is fixed at the time of measurement. The sensor signals can be made to energize torquing means mounted on the gimbal members in order to maintain a fixed angular displacement between gimbals and platform. Use of servo motors as the torquing means coupled with servo amplifiers and otherwise conventional servo mechanism elements thereby provide means for tracking the platform without physical contact. Angle encoder means may also be mounted on the gimbal members to provide an accurate readout of the gimbal orientation.

The servo driven gimbal suspension may also be used in directing the platform through programed motion. Addition of a rotatable mechanical linkage such as ball joints and the like between a follower gimbal and the platform provides one way to accomplish this in which the interconnected members can be kept a fixed distance with respect to one another. Alternately, the platform payload can be provided with drive means such as jet thrusters and the like which are commanded by telemetry signals or flexible electrical connections between the platform and gimbals.

Preferably, the associated bearing and platform components are supported independently of the gimbal means. Such support reduces the torque requirements when driving the gimbals. The gimbals are all suspended from the fixed support in a manner permitting rotation about the various gimbal axes. Said preferred embodiments further employ a three axis gimbal suspension for freedom of movement about all principal axes. In applications requiring less freedom of movement, a lower number of gimbal members may obviously be employed. It is further within contemplation of the invention to support the entire weight of the bearing assembly and its associated platform means on the gimbal members. Eliminating the fixed support can facilitate orthogonal alignment of the gimbal axes.

Figure 1:
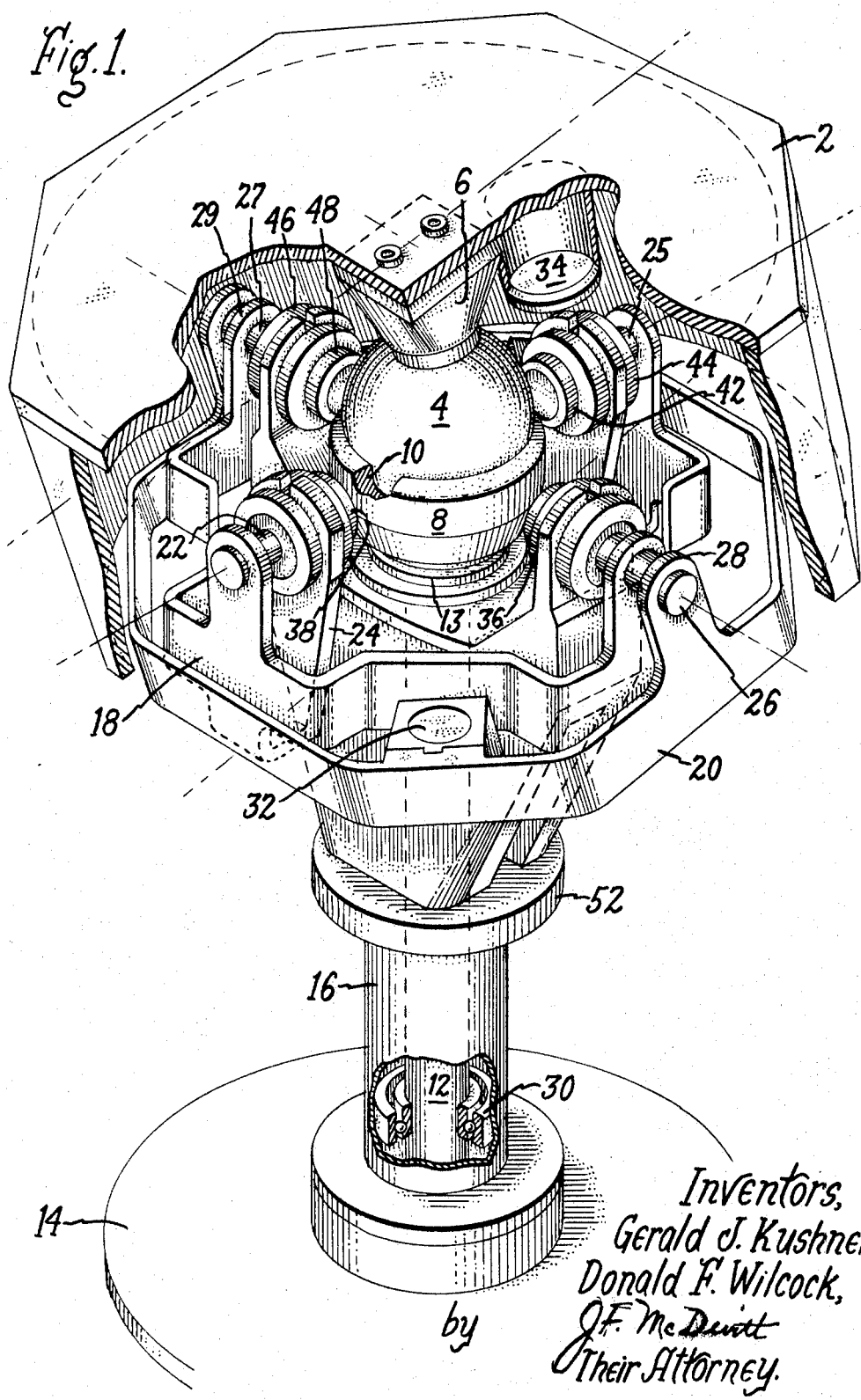
FIGURE 1 is a schematic view partially in cross section of a preferred bearing suspension system of the invention.

Generally, the suspension system in FIGURE 1 has a platform fixed to a spherical bearing assembly which is supported by a vertical post member. Three axis gimbal means are rotatably mounted on said post member. Position sensing means on the outer gimbal member indicates relative angular displacement between the gimbals and the platform body. In detail, platform member 2 is rigidly affixed to spherical rotor 4 at boss element 6. Said rotor is held in a spherical casing member 8 of identical internal contour but slightly larger dimension to provide the bearing surface 10. Vertical post member 12 connects directly to base 13 of said casing member thereby furnishing a support for the entire bearing and platform assembly. Lower base member 14 is attached to the post to provide lateral support for the entire suspension. The gimbal means comprises pedestal member 16 from which is rotatably suspended gimbal members 18 and 20. Inner gimbal member 18 is pivotally mounted on stub shaft 22 which extends horizontally from a fixed bracket 24 on the post. A corresponding attachment of said gimbal at its opposite axial end on stub shaft 25 forms a trunnion suspension to the post. Outer gimbal member 20 is suspended in trunnion relationship to the inner gimbal member by suspension from stub shafts 26 and 27 which extend horizontally from bracket elements 28 and 29, respectively. The inner gimbal is aligned orthogonally from the outer gimbal for rotation of both members about the horizontal axes. Rotation of the pedestal about the vertical axis is obtained by attachment of the member to the post with ball bearings 30 at both upper and lower ends.

An auto auto collimator 32 of known construction is mounted directly on the outer gimbal to provide optical means for indicating angular misalignment between the platform and gimbals. Briefly describing the operation of said auto auto collimator, it comprises means for directing a collimated beam of light against mirror element 34 mounted on the underside of said platform. A change in position of the reflected light beam with displacement between the platform and gimbals generates an error signal in the associated servo mechanism drive. Conventional servo motor 36 mounted on said outer gimbal can be driven to maintain said member at a fixed distance from the platform. Said torquing means advantageously envelop the trunnion shaft of the gimbal for ease of mounting. Likewise, torquing means 38 is mounted directly on the inner gimbal member to drive the gimbal assembly about the mutually perpendicular horizontal axis. Torquing means 40 at the base of the pedestal drives the gimbal assembly along the remaining vertical axis in accordance with well understood servo mechanism principles.

Angle encoder means are also mounted on each gimbal along the respective orthogonal axes. The encoder and resolver elements of a conventional shaft angle readout system are advantageously disposed opposite the torquing means on the gimbal trunnion shafts. Encoder element 42 and resolver element 44 are oriented in this fashion on shaft 25 of the inner gimbal member. A like disposition of encoder 46 and resolver 48 on shaft 27 of the outer gimbal reads out the angular orientation of said member. Encoder 50 and the resolver 52 at the base of the pedestal provide angular readout about the vertical axis. Output readings from the angle encoder means can be transmitted to a known analog recording unit for a permanent record of gimbal orientation with respect to time. While the encoder and torquing means of the present embodiment are physically adjacent on the gimbals, there is no interconnection or necessary coaction between said components. Optical gauges and the like can be connected to the angle encoder means for a visual representation of the gimbal orientation.

In a preferred mode of operation for the above construction, the outer gimbal is kept parallel with the mechanically uncoupled or free platform. This is accomplished with error signals generated by the auto auto collimator being fed to the gimbal servo mechanism drive. The single projector/receiver unit 34 of said auto auto collimator contains both the optics and electronics for detecting and analyzing any displacement between the uncoupled platform and the gimbal assembly. A more detailed description of said auto auto collimator is contained in Product Bulletin No. FS–30 issued March 1964 by the Ordnance Department, General Electric Company, 100 Plastics Ave., Pittsfield, Mass. Said publication is entitled "Three Axis Deflection Monitor, Model No. 067" and describes both the details of construction and mode of operation for the device. The servo system drive the gimbals to minimize the error signals thus maintaining a fixed angular displacement between the outer gimbal and platform. With the gimbal assembly being slaved to the platform in this manner, the angle encoder means accurately reads out the moving platform. If the platform payload also has drive means, such as jet thrusters, it is further possible to program platform motion by commands to the payload. The relatively fixed distance between outer gimbal and platform permits flexible wiring therebetween for transmission of the command information.

The externally pressurized bearing assembly of the embodiment provides nearly frictionless motion about three orthogonal axes. Spherical bearing assemblies of known design that supply a pressurized fluid to the bearing surface can be used. The low friction is attained with a lubricating fluid which may be either liquid or gas. Advantageous, the bearing assembly is of stabilized operation so as not to introduce error torques to the suspension. A gas bearing of particularly stable operation is described in a copending patent application assigned to the assignee of the present invention in the name of Donald F. Wilcock, entitled "Hydrostatic Bearing," Ser. No. 402,743, filed Oct. 9, 1964, and now abandoned. An improvement of this bearing for applications wherein it is desired to provide a gas supply to pneumatically operated components on the platform is described in a second copending patent application assigned to the assignee of the present invention, in the name of Donald F. Wilcock, entitled, "Hydrostatic Bearing," Ser. No. 421,543, filed Dec. 28, 1964.

Figure 2:
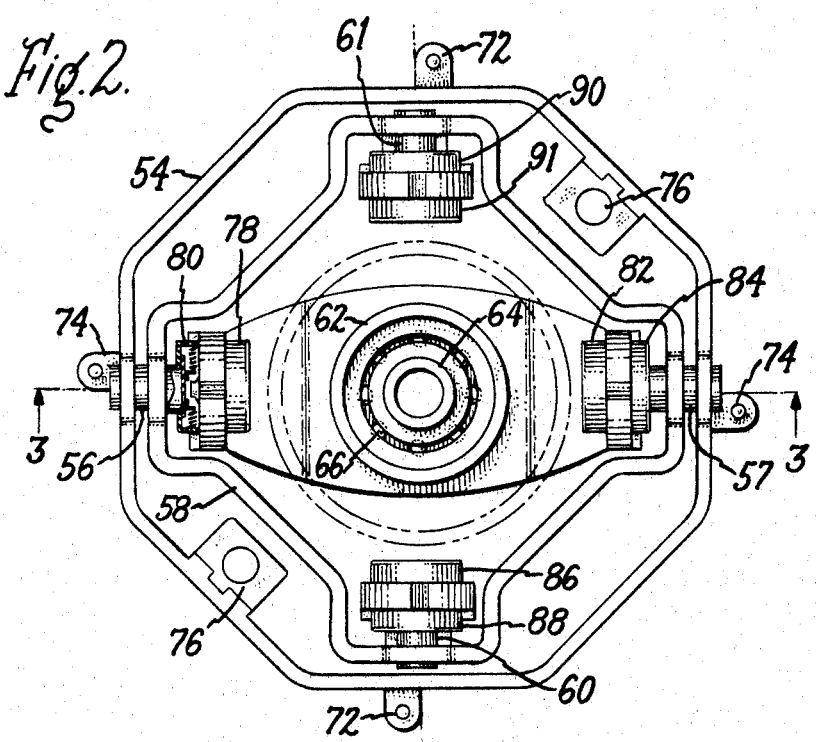
FIGURE 2 is a plan view of a different embodiment of the invention.
Figure 3:
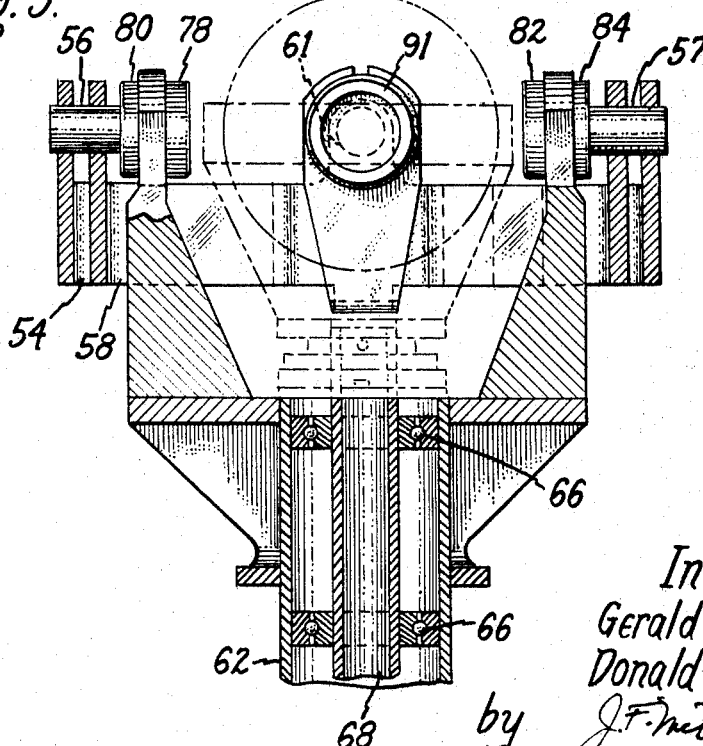
FIGURE 3 is an elevational view partially in cross section taken along line 3—3 in FIGURE 2.

In FIGURES 2–3, there is shown a modified embodiment of the present suspension with three sets of electrical sensing means mounted on the outer gimbal. A phantom relief of the bearing assembly appears in both drawings to more fully illustrate the manner of coaction between various components. More particularly, FIGURE 2 is a schematic plan view depicting said gimbal assembly for the otherwise same suspension system of the previous embodiment. Outer gimbal member 54 is pivotally mounted on trunnion shafts 56 and 57 to rotate about one of the two mutually perpendicular horizontal axes. Inner gimbal member 58 is suspended about trunnion shafts 60 and 61 for rotation about the second horizontal axes. The sectional view in FIGURE 3 taken along lines 3—3 illustrates suspension of said horizontal gimbal members from the vertically aligned gimbal member 62. The latter gimbal is free to rotate about the vertical axis by rotatable mounting to fixed post member 64 with ball bearing elements 66. Axial passageway 68 connects the bearing case member shown in phantom relief with a supply of pressurized fluid for bearing operation. Suitable passage means in said bearing case member for supplying the fluid to the bearing surface are described in the aforementioned referenced patent applications. A base member (not shown) provides a stable lateral support for the entire gimbal system. To ensure accurate readout, all gimbal axes are made to coincide substantially with the center of rotation of the bearing rotor. The orthogonal horizontal axis can be readily aligned with known optical measuring methods wherein the rotor is shifted laterally until alignment is obtained. Alignment of the vertical axis can be accomplished by making the gimbal axis coincide with the nominal sphere position.

Referring again to FIGURE 2, the disposition of proximity sensors on the outer gimbal member provides means to supply error signals to the gimbal drive components. There is a set of two sensor elements on said gimbal for each of the three orthogonal gimbal axes. A first pair of sensors 72 is aligned along one of the two horizontal axes with a second set of sensors 74 being aligned along the second horizontal axis. The vertical sensor set 76 is axially disposed on said outer gimbal at some convenient location off the horizontal axes. Suitable sensor elements are known and include means for inductive impedance or capacitive coupling with the platform member. Utilizing a pair of sensors for each axis permits operation in a balanced bridge circuit which is not susceptible to random spacing variation between the platform and gimbal components. Advantageously, each sensor is individually adjustable so that fixed air gaps can be established between said components. Electrical amplification means located on the outer gimbal are further contemplated to increase the signal level of the sensors to an associated servo mechanism.

As in the FIGURE 1 embodiment, the torquing means and angle encoder means are mounted on the trunnion shafts defining each gimbal axis. A known direct current motor 78 mounted on shaft 56 provides torquing means for the outer gimbal. A tachometer 80 mounted on the same shaft cooperates in feedback stabilization relationship with said drive means in accordance with well accepted servo mechanism principles. Angle encoder element 82 and resolver element 84 are axially disposed across said outer gimbal on the remaining trunnion shaft. Likewise, motor drive means 86 and tachometer 88 are mounted along the inner gimbal axis on member 58. Angle encoder means 90 and 91 for the remaining orthogonal axes are located on said inner gimbal member.

From all of the preceding descriptions, it is readily apparent that by locking the vertical gimbal axis of a three axis gimbal suspension, a two axis mode of operation is possible in which the outer gimbal is maintained parallel with the platform. In this mode of operation pitch and roll orientation angles may be measured but rotational alignment between the platform and gimbal means is not obtained. Likewise, the hereinbefore described principles can be carried out with a two axis gimbal system. Such two axis gimbal system will have one gimbal member aligned along the pitch axis and another gimbal member aligned along the roll axis but lacks a gimbal member about the vertical axis. Operation of said two axis embodiment will still advantageously involve keeping one of the gimbal members parallel to the platform means.

It will be apparent from the foregoing description that a generally improved bearing suspension and reference system has been provided. It is not intended to limit the present invention of preferred embodiments above shown, however, since certain modifications of the present teachings can be made without departing from the true spirit and scope of the invention. As previously pointed out, it is contemplated for certain applications to suspend the bearing assembly directly from the gimbal system. Likewise, the precise operation of the contemplated bearing suspension makes it ideally suited for other critical applications such as telescope mounts, laser tracking platforms and the like. It is intended to limit the present invention, therefore, only to the scope of the following claims.

What we claim as new and desire to be secured by Letters Patent in the United States is:

1. A suspension system which comprises platform means fixed to a spherically shaped rotor, a spherically shaped bearing surface supporting said rotor, housing means for the bearing surface mounted on a fixed support, three axis gimbal means comprising an outer gimbal and inner gimbal aligned so that the gimbal axes are mutually perpendicular in a horizontal plane with said gimbal members being supported in pedestal means free to rotate about an axis in the vertical direction, the intersection of said gimbal axes coinciding substantially with the center of rotation for the rotor, said outer gimbal having sensing means thereon for indicating relative displacement between the gimbal and platform means, drive means mounted on the gimbal means being associated with said sensing means to maintain a fixed angular relationship therebetween, and means for supplying a pressurized fluid to the bearing surface.

2. A suspension system which comprises platform means fixed to a spherically shaped rotor, a spherically shaped bearing surface for supporting said rotor, housing means for the bearing surface mounted on a fixed support, three axis gimbal means comprising an outer gimbal and inner gimbal aligned so that the gimbal axes are mutually perpendicular in a horizontal plane with said gimbal members being supported in pedestal means free to rotate about an axis in the vertical direction, the intersection of said gimbal axes coinciding substantially with the center of rotation for the rotor, said outer gimbal having sensing means thereon for indicating relative displacement between the gimbal and platform means, drive means mounted on each of the gimbal members cooperating in association with said sensing means to maintain a fixed angular relationship between said outer gimbal and the platform means, angle encoder means mounted on said gimbal means, and means for supplying a pressurized fluid to the bearing surface.

3. A suspension system which comprises platform means fixed to a spherically shaped rotor, a spherically shaped bearing surface supporting said rotor, housing means for the bearing surface mounted on a fixed support, three axis gimbal means comprising an outer gimbal and inner gimbal aligned so that the gimbal axes are mutually perpendicular in a horizontal plane with said gimbal members being supported in pedestal means free to rotate about an axis in the vertical direction, the intersection of said gimbal axes coinciding substantially with the center of rotation for the rotor, said outer gimbal having sensing means thereon aligned along each gimbal axis for indicating relative displacement between the gimbal and platform means, drive means mounted on the gimbal means being associated with said sensing means to maintain a fixed angular relationship therebetween, and means for supplying a pressurized fluid to the bearing surface.

4. A suspension system which comprises platform means fixed to a spherically shaped rotor, a spherically shaped bearing surface supporting said rotor, housing means for the bearing surface mounted on a fixed support, three axis gimbal means comprising an outer gimbal and inner gimbal aligned so that the gimbal axes are mutually perpendicular in a horizontal plane with said gimbal members being supported in pedestal means free to rotate about an axis in the vertical direction, the intersection of said gimbal axes coinciding substantially with the center of rotation for the rotor, said outer gimbal having sensing means thereon aligned along each gimbal axis for indicating relative displacement between the gimbal and platform means, drive means located on each gimbal along the gimbal axis cooperating in association with said sensing means to maintain a fixed angular relationship between said outer gimbal and the platform means, and means for supplying a pressurized fluid to the bearing surface.

5. A suspension system which comprises platform means fixed to a spherically shaped rotor, a spherically shaped bearing surface supporting said rotor, housing means for the bearing surface mounted on a fixed support, three axis gimbal means comprising an outer gimbal and inner gimbal aligned so that the gimbal axes are mutually perpendicular in a horizontal plane with said gimbal members being supported in pedestal means free to rotate about an axis in the vertical direction, the intersection of said gimbal axes coinciding substantially with the center of rotation for the rotor, said outer gimbal having sensing means thereon aligned along each gimbal axis for indicating relative displacement between the gimbal and platform means, drive means located on each gimbal along the gimbal axis cooperating in association with said sensing means to maintain a fixed angular relationship between said outer gimbal and the platform means, angle encoder means mounted on said gimbal means, and means for supplying pressurized fluid to the bearing surface.

6. A suspension system which comprises platform means fixed to a spherically shaped rotor, a spherically shaped bearing surface supporting said rotor, housing means for the bearing surface mounted on a fixed support, three axis gimbal means comprising an outer gimbal and inner gimbal aligned so that the gimbal axes are mutually perpendicular in a horizontal plane with said gimbal members being supported in pedestal means free to rotate about an axis in the vertical direction, the intersection of said gimbal axes coinciding substantially with the center of rotation for the rotor, said outer gimbal having sensing means thereon aligned along each gimbal axis for indicating relative displacement between the gimbal and platform means, drive means located on each gimbal along the gimbal axis cooperating in association with said sensing means, a fixed angular relationship between said outer gimbal and the platform means, angle encoder means located on each gimbal along the gimbal axis, flexible electrical wiring between the platform and gimbal means, and means for supplying a pressurized fluid to the bearing surface.

References Cited

UNITED STATES PATENTS

| | | | |
|---|---|---|---|
| 3,074,682 | 1/1963 | Kennel | 74—5 X |
| 3,173,299 | 3/1965 | Peterson | 308—9 X |
| 3,266,052 | 8/1966 | Yamron | 73—1 |

MILTON KAUFMAN, *Primary Examiner.*

FRED C. MATTERN, CORNELIUS, J. HUSAR,
*Examiners.*

J. PUFFER, *Assistant Examiner.*